UNITED STATES PATENT OFFICE.

HANS BRUN LANDMARK, OF DRAMMEN, NORWAY.

PROCESS OF THE PRODUCTION OF TANNING EXTRACT FROM WASTE SULFITE LYE.

1,327,105. Specification of Letters Patent. Patented Jan. 6, 1920.

No Drawing. Application filed April 23, 1915. Serial No. 23,518.

*To all whom it may concern:*

Be it known that I, HANS BRUN LANDMARK, a subject of the King of Norway, residing at Drammen, Norway, have invented an Improvement in Processes of the Production of Tanning Extract from Waste Sulfite Lye, of which the following description, in connection with the accompanying drawings, is a specification, like characters on the drawings representing like parts.

The waste lyes from the sulfite-cellulose-factories contain substances which are of great value in the industry of tanning. Said substances may be divided in two main groups, the substances of one group being absorbed by the hide-fibers in such a manner that they cannot later be washed out of the prepared or finished leather. They enter into an insoluble combination with the hide-fibers and consequently they are to be described as tannin-like substances "tanning substances". The substances of the second main group are absorbed by the pores of the hide or the leather respectively without entering into any combination with the hide-fibers. They may therefore be washed out. The last named substances are also of great importance for the tanning process, a greater portion of them being saccharines, which by fermentation produce the organic acids necessary for the tanning.

The waste lye cannot be used direct, as it also contains substances, which are detrimental to the hide or leather namely: free sulfurous acid, iron and lime, which substances have to be removed. The sulfurous acid is removed by evaporation, the iron and the lime are removed by a precipitation-process by the addition of substances, which with iron and lime form insoluble combinations. The point is of course to produce an extract which contains the most possible of tanning substances. In the lye the proportion between "tanning substances' and "non-tanning substances" is generally about 1:1. The extract, ready for use, should also have about the same proportion. As the iron is present in the shape of a ferric-combination, it can of course be precipitated with alkalis or carbonates of alkalis and the lime may be precipitated with carbonates of alkalis. An extract is hereby obtained, which is free from iron and practically also free from lime, but the proportion between "tanning substances" and "non-tanning substances" is deranged, a considerable portion of tanning substances being converted into "non-tanning substances". The surplus of carbonate of alkali is so large that the amount of ashes becomes considerable.

By using carbonate of ammonium the amount of ashes is kept down, but said salt is too expensive, wherefore only carbonates of soda and potash can be used. As the extract by said treatment becomes highly alkaline, an acid has to be added afterward until the extract has the desired degree of acidity.

An extract obtained by the complete precipitation with carbonate of soda, concentrated until 27° Bé. and acidified with acetic acid gives as an example the following analysis:

| | |
|---|---|
| Tanning substances | 16.70% |
| Non-tanning substances | 29.30% |
| Insoluble substances | 0.10% |
| Water | 53.90% |
| | 100.00% |
| Ashes | 8.9 % |
| Sugar | 6.1 % |

In order to remove the iron in the waste sulfite lye it has been proposed to filter the extract through solid tanning materials as bark (tan) or other materials containing a high percentage of tannin, but without success. The only and the cheapest way of completely removing the iron is by the addition of an inorganic substance to convert it into its hydroxid or its carbonate. It appears that if fixed alkalis be added to the waste lye until the point of neutralization is exactly reached, no derangement takes place of the proportion between "tanning" and "non-tanning" substances. Hereby all of the iron is also precipitated but merely a smaller portion of the lime. The balance of the lime may of course be precipitated with a lime-precipitating acid, but if sulfuric-acid be used the extract has in the first place to be concentrated so much that all gypsum is precipitated, whereby filtration as well as pouring off is rendered difficult and a considerable surplus of acid has to be used, which has to be neutralized afterward, whereby the contents of ashes are augmented.

To precipitate the whole amount of lime with oxalic acid can certainly be done but is not economical. By the use of carbonates of alkali instead of fixed alkalis a somewhat larger surplus beyond the point of neutralization may be added without materially deranging the proportion between "tanning" and "non-tanning" substances.

In order to get all the lime precipitated a considerable surplus of carbonates of alkalis has to be used; about as much as three to four times the amount consumed in order to reach the point of neutralization, but then an extract of a type as stated above is obtained.

From what has been stated it is clear that by means of carbonates of alkalis and a calcium-precipitating acid I am able to produce an extract of the desired type. In order to obtain an extract, in which the original proportion between "tanning" and "non-tanning" substances is maintained a certain amount, for instance of carbonate of sodium is added beyond the point of neutralization. Hereby iron and the greater part of calcium is precipitated. The balance of the calcium is precipitated by a calcium-precipitating acid, for instance oxalic acid.

If it is desired to produce an extract which shall serve exclusively as filling substance in the finished leather, that is as substitute, for instance for glucose, the proportion between "tanning" and "non-tanning" substances is of no such importance as by the tanning of the leather. An extract of a less percentage of "tanning" substances may be used, but the total amount of extractive matter must be present. Such an extract is obtained by increasing the amount of carbonate of soda, whereby more calcium in the shape of carbonate is precipitated, and a saving is obtained in the consumption of the expensive calcium-precipitating acid. The extract, from which the calcium and the iron are removed, is slightly alkaline or slightly acid, all according to the manner in which the precipitation has been conducted.

Some of the sugar contained in the lye may according to the circumstances have been converted into saccharate, whereby the fermentability of the extract is lowered. As sugar by fermentation produces the acids necessary for the tanning process it is of great importance that the sugar be present in a fermentable shape. To the alkaline or slightly acidulous extract respectively is therefore added a suitable amount of acid and the extract is brought to the required degree of concentration in an evaporator, whereby also a decomposition of eventually present saccharate or an inversion of sugar respectively takes place.

*Example.*

A certain amount of waste lye of about 7° Bé. is concentrated in an evaporator up to a suitable concentration of about 16 to 18° Bé. All sulfurous acid is hereby removed. In the warm lye precipitation is carried out with a suitable quantity of carbonate of alkali, for instance carbonate of sodium. Neutralization would per liter of the original quantity of lye for instance consume nine grams (0.32 oz.) carbonate of sodium. The addition of soda is continued beyond the point of neutralization and instead of 9 gr. for instance 18 grams are added per liter of the original lye. For the precipitation of the calcium in the present case about 29 gr. carbonate of sodium would have been necessary. After deposit the liquid is separated by pouring off or by filtration and the precipitation of the balance of the calcium is completed with a calcium-precipitating acid. To the filtrate is added a suitable quantity of organic acid for the decomposition or inversion respectively of any eventually present saccharate and it is then brought up to the required concentration. The organic acid used may be formic acid or any other organic acid suitable for the purpose.

Such an extract concentrated to 27.5° Bé. has the following analysis:

| | |
|---|---|
| Tanning substances | 24.10% |
| Non-tanning substances | 24.00% |
| Insoluble substances | 0.00% |
| Water | 51.90% |
| | 100.00% |
| Ashes | 4.5% |
| Sugar | 6.8% |

The contents of $Fe_2O_3$ $Al_2O_3$ in the ashes is so small, that it can not be determined by precipitation with ammonia. With sulfocyanid of potash (Rhodankalium) only a weak reaction is obtained. Of CaO the ashes contain 3.00% corresponding to 0.14% in the extract. For the sake of comparison it may be stated that the quebracho-extract also contains traces of iron and 0.23% CaO.

Having thus described my invention, what I claim is—

1. A process for the production of tanning extract from waste sulfite-lye, characterized by first evaporating the lye to a degree of concentration suitable for the expulsion of all free sulfurous acid; thereupon treating the lye with a carbonate of an alkali beyond the point of neutralization in order to precipitate all of the iron and most of the calcium; adding a lime precipitating acid to the strained liquor to precipitate the remaining calcium; and mixing with the liquor an excess of an organic acid and evaporating to a degree of concentration suitable for the decomposition of any saccharate that may be developed.

2. A process for the production of tanning extract from waste sulfite-lye, characterized by first evaporating the lye to a degree of concentration suitable for the expulsion of all free sulfurous acid; thereupon treating the lye with sodium carbonate beyond the point of neutralization in order to precipitate all of the iron and most of the calcium; adding oxalic acid to the strained liquor or filtrate to precipitate the remaining calcium; and mixing with the liquor an excess of an organic acid and evaporating to a degree of concentration suitable for the decomposition of any saccharate that may be developed.

3. A process for the production of tanning-extract from waste sulfite-lye, characterized by evaporating waste sulfite lye to a concentration of about 16° to 18° Baumé; adding to the concentrated solution about 18 grams of carbonate of sodium for each liter of the amount of lye before concentration; separating the liquid from the precipitate thus obtained; and adding to said liquid a quantity of oxalic acid sufficient to precipitate the calcium still remaining in solution; separating the liquid from the precipitate thus obtained and adding a sufficient quantity of formic acid to decompose any saccharate that may be present; and concentrating the solution thus obtained to about 27.5° Baumé.

In testimony whereof I affix my signature in presence of two witnesses.

HANS BRUN LANDMARK.

Witnesses:
   HJALMAR IHLEN,
   T. CHRISTENSEN.